United States Patent Office 2,868,790
Patented Jan. 13, 1959

---

2,868,790
MANUFACTURE OF BARBITURIC COMPOUNDS

Arne Elof Brandstrom, Uppsala, Sweden, assignor to Aktiebolaget Pharmacia, Uppsala, Sweden, a Swedish company No Drawing. Application February 6, 1956
Serial No. 563,444

Claims priority, application Sweden February 15, 1955

2 Claims. (Cl. 260—257)

This invention relates to manufacture of barbituric compounds and it comprises a process of manufacturing barbituric compounds having the general formula:

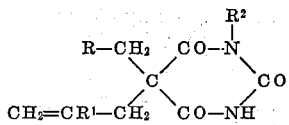

including the alkali metal salts thereof, wherein R represents a low molecular tertiary alkyl group containing from 4 to 7 carbon atoms, $R^1$ represents a substituent selected from the class consisting of hydrogen and halogen atoms, and $R^2$ represents a substituent selected from the group consisting of hydrogen and alkyl groups containing from 1 to 5 carbon atoms; said process comprising condensing, in the presence of a basic condensing agent, a barbituric compound having the general formula:

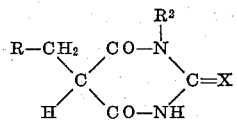

including the alkali metal salts thereof, wherein R and $R^2$ have their previous significancies and X is a substituent selected from the class consisting of =NH and =O, with a halide having the general formula $$CH_2=CR^1-CH_2-Y$$

wherein $R^1$ has its previous significance and Y is a halogen atom, followed by recovery of the resulting barbituric compound. In addition the invention includes, as novel products, certain β,β,β-trialkyl-ethyl-halo-allyl barbituric compounds produced by the described process, these compounds having unexpected advantages over the corresponding non-halogenated allyl compounds and having the general formula:

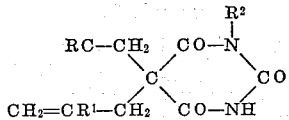

wherein R has its previous significance and $R^1$ represents a halogen substituent selected from the class consisting of chlorine and bromine atoms; all as more fully hereinafter set forth and as claimed.

As I have stated in my copending U. S. patent application Serial No. 540,170, filed October 12, 1955 I have found that the allyl barbituric compounds wherein $R^1$ represents hydrogen, as defined above, possess valuable therapeutic properties. However, attempts to produce the same synthetically by condensing the corresponding malonic acid esters with carbamide derivatives, as disclosed in said prior application, have not proved quite satisfactory because of low yields and difficulties involved in recovering the pure compounds.

It has now been found that these barbituric compounds can be obtained in a high degree of purity and in high yields with the use of relatively easy purification techniques by the procedure of condensing, in the presence of a basic condensing agent, a 3-halopropene with a barbituric compound of the general formula:

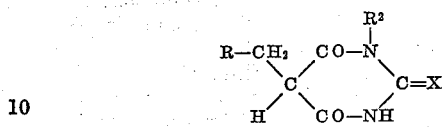

wherein R represents a tertiary alkyl group containing from 4 to 7 carbon atoms, $R^2$ represents hydrogen or an alkyl group containing from 1 to 5 carbon atoms, and X represents an oxygen atom or an imino group. The reaction which takes place can be represented by the equation

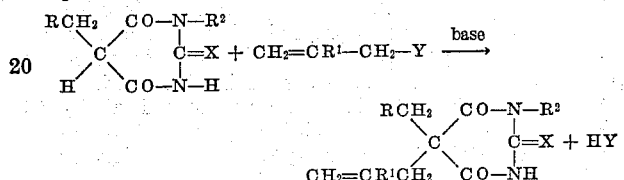

wherein $R^1$ represents a hydrogen atom and Y a halogen atom.

In addition I have discovered that it is possible to produce certain novel halo-allyl barbituric acid compounds by substituting 2,3-halopropenes for the 3-halopropene in the process outlined above. These novel halogenated compounds have new and unexpected therapeutic properties as compared with the corresponding non-halogenated compounds. In the process of making these halogenated compounds $R^1$ in the above equation of reaction represents a halogen selected from the class consisting of chlorine and bromine.

When the substituent X in the barbituric compound represents an imino group the condensation product can be hydrolized in accordance with the equation:

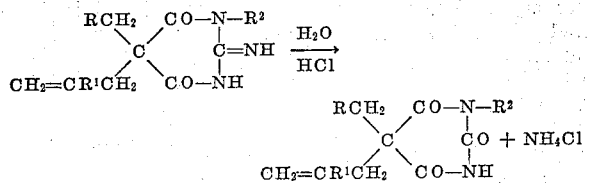

In conducting the condensation reaction any strongly basic condensation agent can be employed. Among these are the alkali metals and their alkoxides, hydroxides and alkaline reacting salts. The reaction is usually conducted by dissolving or suspending in a suitable inert solvent, preferably water, the barbituric compound in the form of its acid or alkali metal salt, the required propene halide, and the basic condensing agent, which may be sodium hydroxide or sodium carbonate, for example. When the reaction has once begun it proceeds by itself but it can be accelerated by heating, if desired, for example by boiling the mixture under a reflux condenser. In order further to accelerate the reaction it is possible but by no means necessary to add a small amount of a metal condensation catalyst, for example a finely-divided metal such as copper, cobalt and nickel, or a soluble salt of one of these metals, such as the chloride or sulfate. Metallic copper or a soluble copper salt is preferred. By this procedure it is possible to produce barbituric acid compounds wherein R of the above formulae represents tert.-butyl, tert.-amyl, β,β-dimethyl butyl and tert.-heptyl groups.

The barbituric acid compound which is used in the process may be produced by condensing a suitable malonic acid ester or a cyano-acetic ester with a urea compound. The reaction mixture obtained in this reaction can frequently be reacted directly with the propene halide without separation or purification of the barbituric acid compound. Usually the pH of the reaction mixture has to be adjusted by addition of the basic condensing agent before addition of the propene halide. The final condensation product obtained is usually as readily purified as a product obtained by reacting purified compounds.

If the propene halide employed in the reaction is 2,3-dichloro- or 2,3-dibromo-propene and if R represents a tertiary butyl group, a series of barbituric acids is obtained which are especially valuable as hypnotics and sedatives and which are characterized by being readily excreted from the body. These compounds are also characterized by their property of being broken down rapidly in the body and are therefore particularly suitable as intravenous narcotics. The most valuable of these compounds are those wherein $R^2$ of the above formulae represents hydrogen or a methyl, ethyl, isopropyl, sec.-butyl or amyl substituent. In addition to their other valuable pharmacological properties, these halo-allyl compounds also produce a strong antiepileptic effect, whereby their therapeutic value is further increased.

My invention can be disclosed in greater detail by reference to the following specific examples which represent practical embodiments of my process of producing barbituric compounds.

*Example 1.—Synthesis of neopentylallyl barbituric acid*

In a 3 liter three-necked flask, provided with a stirrer, reflux condenser and glass stopper, 55 g. of sodium are dissolved in 1100 ml. of absolute methanol. 75.5 g. of urea and 230 g. of neopentyl malonic acid diethyl ester are added thereto. The mixture is boiled on an oil bath for 4 hours, whereupon the methanol is distilled off under reduced pressure on the oil bath, the temperature of which should not exceed 120° C. When no more methanol distills off, the contents of the flask are dissolved in 500 ml. of water and, after cooling, 128 ml. conc. HCl is added thereto. The pH of the solution is thereby adjusted to about 8 and a small precipitate is formed. 121 g. allylbromide is added and the mixture is stirred over night. The product which has precipitated is filtered off, washed with water and petroleum ether, dried and recrystallized from 600 ml. of 50% methanol. A yield of 149 g. neopentylallyl barbituric acid, M. P. 154° C. is obtained.

*Example 2.—Synthesis of neopentylallyl barbituric acid*

If in Example 1 the allyl bromide is replaced by an equivalent amount of allyl chloride, and in addition 2 g. of copper sulfate are added to the reaction mixture, the same yield of neopentylallyl barbituric acid as in the previous example is obtained. If the product contains impurities in the form of copper compounds, these may be removed by the addition of a small amount of ethylene diamine tetraacetic acid in the recrystallization procedure.

*Example 3.—Synthesis of neopentylallyl barbituric acid*

49.4 g. of 5-neopentyl-2-iminobarbituric acid are dissolved in 350 g. of water containing 16.5 g. KOH. The solution is filtered, and to the clear filtrate are added 46 g. of allylbromide. The mixture is stirred for 3 hours, whereupon the 5-neopentyl-5-allyl-2-iminobarbituric acid formed is filtered off and washed with water and alcohol. After drying to constant weight, the product weighs 47 g. The dried iminobarbituric acid is hydrolyzed by boiling it under a reflux with a mixture of 125 ml. of concen. hydrochloric acid and 123 ml. of water for 12 hours. The crystals are sucked off in a Büchner funnel, washed with water and recrystallized from 50% methanol in the presence of a small amount of decolorizing carbon. The yield is 35 g. neopentylallyl barbituric acid, M. P. 154° C.

*Example 4.—Synthesis of 1-methyl-5-neopentyl-5-bromallyl barbituric acid*

53 g. of 1-methyl-5-neopentyl barbituric acid are dissolved in 250 ml. of water containing 10 g. sodium hydroxide. 100 g. 2,3-dibromo propene and a solution containing 2.5 g. of crystallized cobalt sulfate in 25 ml. of water are added thereto. The mixture is stirred for 24 hours. The crystals are sucked off in a Büchner funnel, washed with petroleum ether and dried at 60° C. The product so obtained is dissolved in a solution containing 15 g. of NaOH in 400 ml. of water and 5 g. of sodium ethylene diaminetetra acetate are added thereto. The solution is extracted with benzene, then acidified with hydrochloric acid. During this operation pieces of ice are added to keep the temperature below 20° C. The precipitate obtained is filtered off, washed with water and dried at 60° C. whereupon it is recrystallized from toluene. The yield of 1-methyl-5-neopentyl-5-bromallyl barbituric acid so obtained is 59 g., having a M. P. of 182–183° C.

*Example 5.—Synthesis of 1-ethyl-5-neopentyl-5-bromallyl barbituric acid*

If in Example 4 the 1-methyl-5-neopentyl barbituric acid is replaced by 56.7 g. of 1-ethyl-5-neopentylbarbituric acid, 41.2 g. of 1-ethyl-5-neopentyl-5-bromallyl barbituric acid, M. P. 146° C. are obtained.

*Example 6.—Synthesis of 1-isopropyl-5-neopentyl-5-bromallyl barbituric acid*

If in Example 4 the 1-methyl-5-neopentyl barbituric acid is replaced by 60 g. of 1-isopropyl-5-neopentyl barbituric acid, 49 g. of 1-isopropyl-5-neopentyl-5-bromallyl barbituric acid, M. P. 178° C. are obtained.

*Example 7.—Synthesis of 1-sec.-butyl-5-neopentyl-5-bromallyl barbituric acid*

If in Example 4 the 1-methyl-5-neopentyl barbituric acid is replaced by 64 g. of 1-sec.-butyl-5-neopentyl barbituric acid, 47.7 g. of 1-sec.-butyl-5-neopentyl-5-bromallylbarbituric acid, M. P. 166° C. are obtained.

*Example 8.—Synthesis of 1-methyl-5-neopentyl-5-chloroallyl barbituric acid*

If in Example 4 the 2,3-dibromo propene is replaced by an equimolecular amount of 2,3-dichloro propene 40 g. of 1-methyl-5-neopentyl-5-chloroallylbarbituric acid, M. P. 180° C. are obtained.

*Example 9.—Synthesis of 5-(β,β-dimethylbutyl)-5-allyl barbituric acid*

If in Example 1 the neopentyl malonic ester is replaced by 246 g. of β,β-dimethylbutyl malonic ester, 140 g. of 5-(β,β-dimethylbutyl)-5-allyl-barbituric acid, M. P. 140° C. are obtained.

*Example 10*

The sodium salts of the barbituric acids according to Examples 1–9 may be produced by dissolving 23 g. of sodium in 350 ml. of absolute methanol in a vessel provided with reflux condenser and adding a solution containing 1 mol of the corresponding barbituric acid dissolved in the smallest possible quantity of methanol. The solution (or in certain cases the mixture) so obtained is concentrated in vacuum while heating on a water bath. 200 ml. of benzene are added and the mixture is again concentrated and vacuum dried to complete dryness under the smallest possible pressure, for example 1–2 mm. Hg. When the alkali metal salts of bromoallyl-substituted barbituric acids are to be produced, the temperature should under no circumstances exceed 50° C. whereas in the case of allyl-substituted barbituric acids the heating may be carried out on a boiling water bath. The yield of the dried sodium salt is practically quantitative.

While I have described what I consider to be the best operating embodiments of my process it is evident, of course, that various modifications can be made in the specific procedures which have been described without departing from the purview of this invention. Thus, while in the specific examples the condensation reactions have been conducted in the presence of water as an inert solvent, the water can be replaced by inert organic solvents for the reaction components, such as acetone, for example. The specific examples illustrate how the sodium salts of the barbituric acids can be produced. It is also obvious, of course, that other alkali metal salts, such as the potassium or lithium salts, can be produced by substituting potassium or lithium for the sodium used in Example 10. Any of the conventional strongly basic condensing agents can be used in the process. And any of the conventional metal condensing catalysts can be employed. Further modifications of my process which fall within the scope of the following claims will be immediately evident to those skilled in this art.

What I claim is:
1. 1-methyl-5-neopentyl-5-bromoallylbarbituric acid and its alkali metal salts.
2. 1-ethyl-5-neopentyl-5-bromoallylbarbituric acid and its alkali metal salts.

References Cited in the file of this patent

UNITED STATES PATENTS

| | | |
|---|---|---|
| 1,998,102 | Shonle | Apr. 16, 1935 |
| 2,072,829 | Schneider | Mar. 2, 1937 |
| 2,080,071 | Boedecker et al. | May 11, 1937 |
| 2,161,212 | Whitmore et al. | June 6, 1939 |